ured and forty-eight-ten thousand five hundred and seventieths to Chemprotin Products,

UNITED STATES PATENT OFFICE 2,430,885

GLIADIN SUSPENSIONS AND FILMS

James H. Obey, Pittsburgh, Pa., assignor, by mesne assignments, of nine thousand four hundred and forty-eight-ten thousand five hundred and seventieths to Chemprotin Products, Trenton, Mich., a limited partnership, five hundred and sixty-one-ten thousand five hundred and seventieths to Laszlo Kormendi, New York, N. Y., and five hundred and sixty-one-ten thousand five hundred and seventieths to B. Clark Boeckeler, Grosse Ile, Mich.

No Drawing. Application May 12, 1944, Serial No. 535,401

1 Claim. (Cl. 260—6)

This invention relates to dispersions and films made from gluten and is herein disclosed in some detail as embodied in suspensions and films made from an alcohol extract gluten of the general type known as gliadin.

Many attempts have been made to produce dispersions of gluten suitable for the basis of paint or for the making of films suitable for wrappings of various kinds, but many difficulties have been encountered.

Gluten is largely obtained from wheat in the manufacture of starch and of other materials, and for that reason, varies in composition from lot to lot. No satisfactory procedure has yet been devised for producing from this variable gluten commercial products of the uniform characteristics needed to meet the requirements of industry.

Alkaline aqueous dispersions carrying gluten have been tried but have involved many difficulties. Usually strong solutions of some alkali have been used to dissolve or suspend the gluten. The alkaline solutions were so strong that they hydrolyzed or otherwise fundamentally modified the properties of the gluten. The solutions of other chemicals were either useless or prohibitively expensive.

According to the present invention, a solution of the gliadin in an alcohol such as ethanol is used as a starting point for the preparation of a film or of a more complicated dispersion.

It was found, most unexpectedly, that certain substances like abietic acid and oleic acid, when present in suitable quantities, clarified a deposited film of alcohol-soluble gluten so that it lost the normal opaqueness of such films.

A water-white film was obtained by the unpredictable step of first precipitating out the alcohol-soluble material from gluten by water and then mixing the precipitated material with a suitable synthetic resin and forming a film therefrom. The film could also for some purposes include the abietic or oleic acid. Other films were shattered by immersion in cold water, but it was found that a shatterable film became practically inert to water if treated with cold water for a period short of the shattering period and then dried before being wet again.

Some otherwise unsatisfactory films became satisfactory when coated with linseed oil and then heat treated.

Other features and advantages will hereinafter appear.

Example I 200 grams of commercial wheat gluten were extracted at room temperature with 900 cc. of an 80% alcohol.

The liquid was filtered off and the filtrate decolorized by warming with activated charcoal and the liquid was then evaporated under a vacuum to medium viscosity; 50 cc. of 95% ethanol was then added, and again evaporated down to about 55 cc.

The unaltered concentrated dispersion of gliadin was modified by adding abietic acid dissolved in as little 95% ethanol as possible until the solution, which carried 48% of the gliadin, also carried 5% abietic acid and some water, say one-tenth as much abietic acid as water. It was found that the amount of water could be varied widely without much change in properties of the dissolved gliadin.

The resulting solution yielded an excellent water-white film.

It was found that oleic acid could be substituted for the abietic acid provided not more than 0.15 of oleic acid was added, based on the solid gliadin carried in the dispersion.

It was found that the minimum ratio of gliadin to abietic acid for efficiency was about 8 to 1.0. If about 20% of glycerine (based on the gliadin) was added to the solution before casting, a clear highly flexible film was obtained.

It was found that a film was obtained free from air bubbles if there was added small amounts of octyl alcohol to the solution before casting the film, but this addition reduced the transparency of the film to some extent.

It was found possible to produce a more water-resistant film by incorporating a synthetic resin in the gliadin solution before casting the film. Such a film was somewhat opaque but rendered less opaque by incorporating abietic acid. Several synthetic resins were used, and some tended to produce some opaqueness in the cast film but that objection was overcome by making the solution faintly acid or by adding a little ammonium sulphate before casting the film.

Example II 30 grams of a 25.2% dispersion of gliadin in ethanol was mixed with

| | Grams |
|---|---|
| Glycerine | 9 |
| Urea-formaldehyde resin | 10 |
| Water | 6 |
| Ammonium sulphate | 0.5 |

The mixed composition was cast into films and cured at 75° C. overnight, producing a nearly white slightly opaque film.

Example III

A film which retained much tensile strength even after twenty-four hours soaking in cold water was produced by mixing 10 cc. gliadin solution, containing 2.52 grams gliadin with 3.15 cc. water solution of soluble urea-formaldehyde resin carrying 2.54 grams of the dry resin, and then adding 3 drops concentrated hydrochloric acid to the solution, giving a pH of about 4. The resulting film was very satisfactory. Some films shattered after three or four minutes immersion in cold water. It was found that this shattering did not take place even after long immersion, if a film was immersed for two minutes and then dried before further immersion. Films were made more clear, if abietic acid was included in the gliadin dispersion.

A film similar in properties but softening after an hour and a half in cold water was obtained when the added resin solution was reduced to 1.08 cc. carrying 1.58 grams of resin.

Example IV

A water-white film containing resin was obtained by a different procedure. The gliadin was first precipitated by adding water to 10 cc. of a 25.2% gliadin dispersion in alcohol, and a white dispersion produced. The excess water was decanted off, and 3 grams glycerine added. A separate dispersion of resin compatible with the gliadin was prepared by dispersing 2.11 grams of urea-formaldehyde resin, 25.4%, in two grams water and .06 gram ammonium sulphate. The two dispersions were mixed and cast to form a film which was clear and water-white with a very slight opacity.

Applying a coating of linseed oil to some of the films produced a film that was water resistant in addition to other good properties.

The film containing the urea-formaldehyde resin above referred to was kept overnight at a temperature of 110° C. after being coated with a film of linseed oil without any dryer. The resulting film was light brown. It warped slightly when soaked four minutes in cold water, and the surface cracked slightly after four hours soaking. It had not bloomed but had reduced shear strength.

Linseed oil had a similar effect on films containing abietic acid in addition to other ingredients.

Example V

An extremely tough film was prepared by mixing

| | Grams |
|---|---|
| Dispersion carrying 21.7% gliadin | 10 |
| Glycerine | 2.89 |
| 60% solution of the resin described below | 2.71 |
| Water | 1 |

The resin was prepared by mixing together

| | Grams |
|---|---|
| Urea | 90 |
| 35% formaldehyde solution | 306 |
| Zinc oxide | 3 |
| Water | 51 | refluxing and filtering to obtain a clear filtrate, which slowly became cloudy. The filtering was repeated three times, and the final filtrate evaporated down to about 125 cc. under vacuum. It thickened overnight and was diluted with 95% alcohol.

The resin containing gliadin film made by casting the mixed solution was soaked in dilute hydrochloric acid and cured at 80° C. overnight, turning from white and slightly opaque to brown and becoming extremely tough. The treated film was extremely tough when dry.

Example VI 10 grams commercial gluten was suspended in 45 cc. cold water. Then there was added 10 cc. of a 50% sodium salicylate solution and a few drops 29% ammonia solution; and stirred for one and one-half hours. The final pH was 8 to 9 and the dispersion was of medium viscosity. 26.9 grams of the above dispersion were mixed with 2.5 grams of C. P. glycerine and 3.3 grams linseed oil. The final mix was cast as a film and was tan in color, very flexible, easily removed from the plate on which it was cast. Writing could easily be read through it at a distance of one-sixteenth of an inch.

These examples are illustrative of the methods embodying my invention, and it is to be understood that the proportions of solvents and alkali are merely illustrative since other proportions and equivalents may be employed within the scope of my invention as indicated by the following claim.

Having thus described certain embodiments of my invention, I claim:

A composition of matter which comprises an admixture in the proportion of 30 grams of a 25.2% dispersion of gliadin in ethanol, 9 grams of glycerine, 10 grams of urea-formaldehyde resin, 6 grams of water and 0.5 gram of ammonium sulphate.

JAMES H. OBEY.

REFERENCES CITED

The following references are of record in the file of this patent:

UNITED STATES PATENTS

| Number | Name | Date |
|---|---|---|
| 2,185,118 | Coleman | Dec. 26, 1939 |
| 1,748,949 | Gentile | Mar. 4, 1930 |
| 2,133,335 | Wilson | Oct. 18, 1938 |
| 2,285,758 | Sturken | June 9, 1942 |
| 2,167,570 | Heckel | July 25, 1939 |
| 684,522 | Painter | Oct. 15, 1901 |
| 2,103,293 | Lippert | Dec. 28, 1937 |
| 2,053,850 | Sturken | Sept. 8, 1936 |
| 2,185,121 | Coleman | Dec. 26, 1939 |

OTHER REFERENCES

Swallen: Ind. & Eng. Chem., vol. 33, 1931, pages 394–398.

Bogue: Colloidal Behavior, 1924, pages 581 to 585 and 588, vol. II.